UNITED STATES PATENT OFFICE.

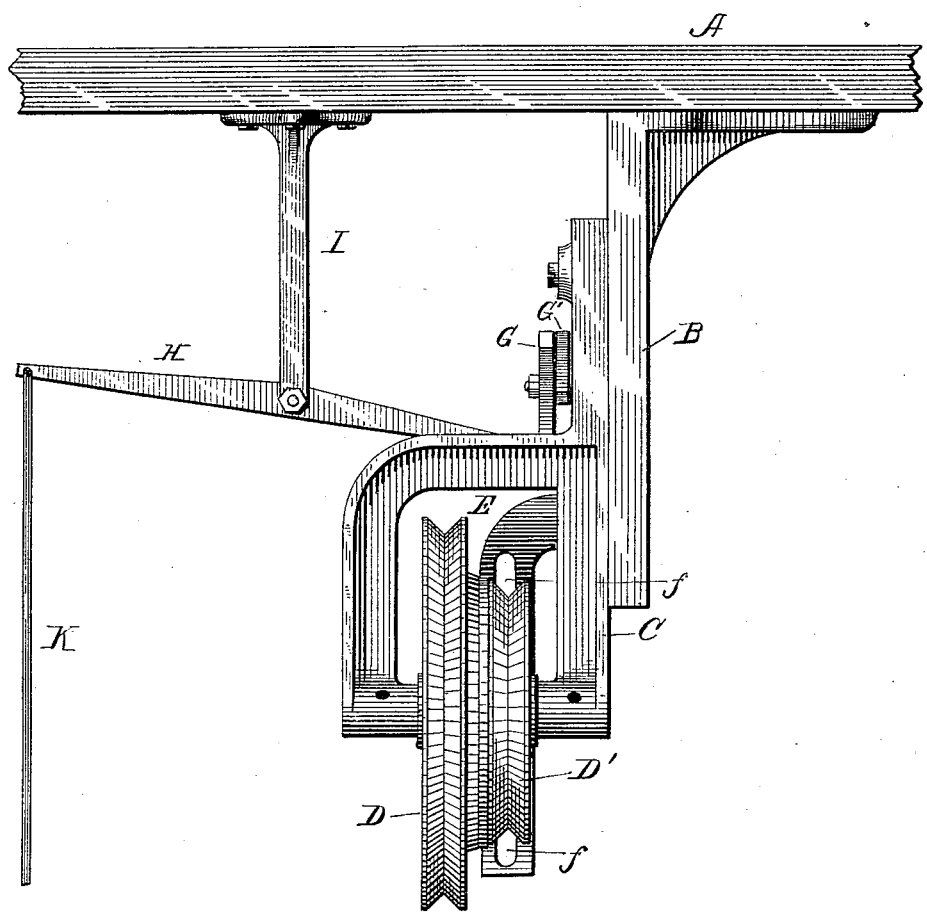

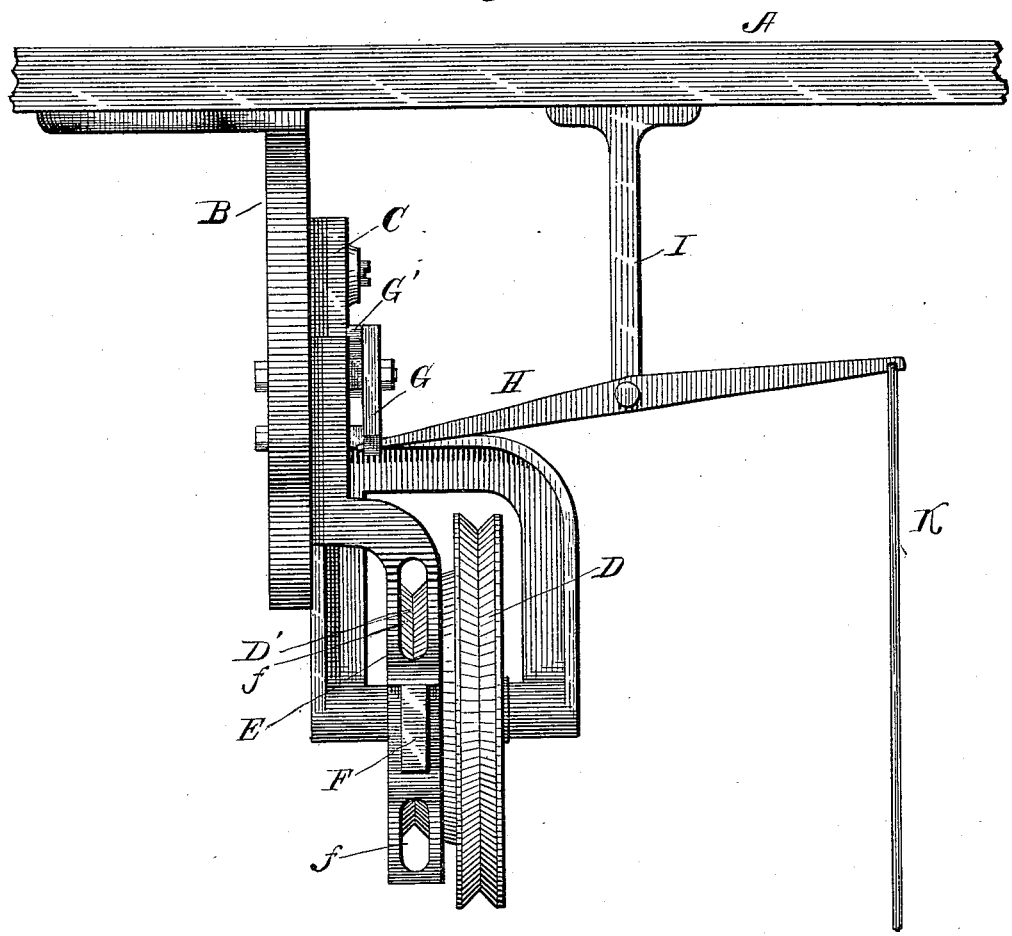

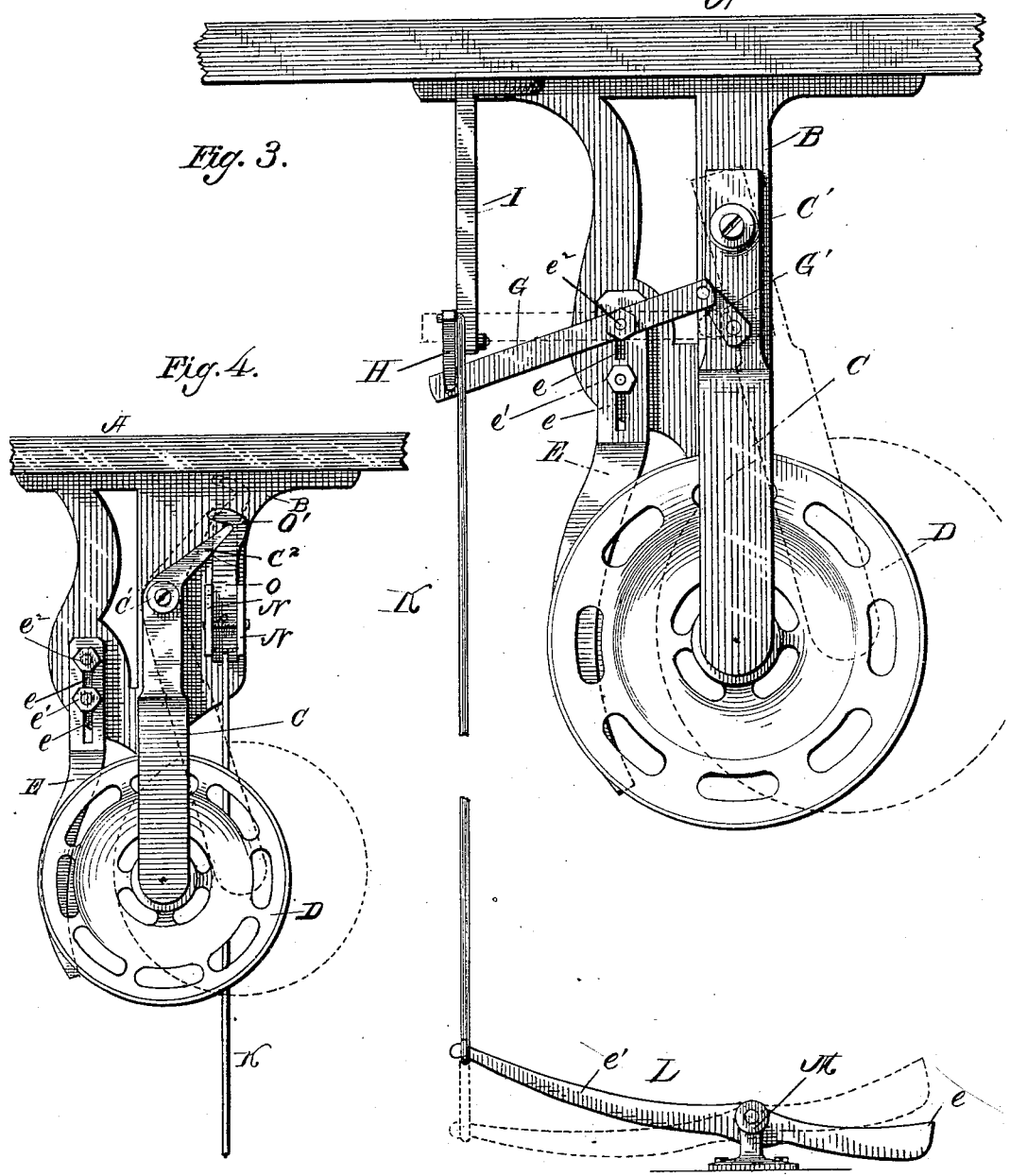

WILLIAM R. SOMERS, OF BRIDGEPORT, CONNECTICUT.

POWER-TRANSMITTER.

SPECIFICATION forming part of Letters Patent No. 282,679, dated August 7, 1883.

Application filed May 25, 1883. (No model.)

*To all whom it may concern:*

Be it known that I, WILLIAM R. SOMERS, a citizen of the United States, residing at Bridgeport, in the county of Fairfield and State of Connecticut, have invented certain new and useful Improvements in Power-Transmitters; and I do hereby declare the following to be a full, clear, and exact description of the invention, such as will enable others skilled in the art to which it appertains to make and use the same.

My invention relates to power-transmitters, and has for its object to enable the operator of a machine to put the same into and out of connection with the main driving-shaft instantly without change of position and with very slight exertion.

With these ends in view my invention consists in the construction and combination of parts, as hereinafter fully described, and then specifically designated by the claims.

For the purpose of enabling those skilled in the art to which my invention appertains to understand and use my improved device, I will proceed to describe the same, referring by letters to the accompanying drawings, forming part of this specification, in which—

Figure 1 is a front view; Fig. 2, a rear view; Fig. 3, a side view, showing the operating-wheel thrown out of connection with the driving-shaft. The dotted lines indicate the positions of the operating-wheel and the treadle when the machine is in operation, and Fig. 4 is a similar view of a modification.

A represents a table upon which the machine or any number of machines to be operated may be placed, my invention being specially adapted for use in factories, where a large number of machines—as, for instance, sewing-machines—are operated from a single shaft.

B is a bracket suspended beneath the table, to which the swinging carrying-frame C is pivoted, as at C'.

D D' are the parts of a double wheel, which is preferably cast in a single piece, and is journaled in the carrying-frame. This wheel I term the "operating" wheel. Both parts are ordinarily grooved to accommodate small belts. The belt from the main shaft D' and the operating-belt pass over part D. Separate pulleys may be used, if preferred.

E is a rigid brake, pivoted by a slotted connection to the bracket.

$e\ e$ are the slots through which the attaching-bolts pass. The brake is made adjustable in order that it may be raised or lowered to accommodate different wheels or different adjustments of the driving-shaft. The brake is retained in the desired position by simply tightening nut $e'$.

F is the friction-pad, which acts on the surface of the wheel, or on the machine-belt, or on both wheel and belt. $f\ f$ are apertures in the brake, through which the driving-belt passes.

G is a lever fulcrumed on pin $e^2$. At the forward end of this lever is pivoted a link, G', which in turn is pivoted to the carrying-frame, thus forming a toggle-joint. The rear end of this lever is provided with a hole, through which the end of the operating-lever H passes. This lever is pivoted about midway of its length to a hanger, I, secured to the under side of the table. The other end of this lever is connected by a rod or pitman, K, with the treadle L. The treadle has its fulcrum or is journaled in a standard, M, which is secured to the floor.

The operation is as follows: Supposing the machine to be running, if it be desired to throw it out of connection with the driving-shaft, (not shown,) the operator has only to press down on the front portion of the treadle—that is, that portion of the treadle between the operator and the fulcrum. When it is desired to throw the machine (not shown) into connection with the driving-shaft, the operator presses down upon the rear portion of the treadle—that is to say, back of the fulcrum. When the rear end of the treadle is pressed down, it brings down the end of the operating-lever, to which it is attached by rod K, and raises the other end of said lever, which engages with the rear end of lever G, thereby causing the front end of lever G and link G' to act as a toggle-joint and carry the swinging frame, and with it the wheel D, into operative position. It will thus be seen that the treadle need be touched only when it is desired to throw the operating-wheel into or out of connection with the driving-shaft, and that connection or disconnection may be made with slight exertion and without change of position on the part of the operator. It follows from the construction shown that the parts will maintain the position in which they are placed without pressure upon the treadle. When the operating-wheel is thrown out of its operative position, it comes in contact with the rigid brake, which serves to check its rotation almost instantly.

I do not desire to limit myself to the exact construction shown, as it is evident that the details—as, for instance, the mode of operating the carrying-frame—may be varied without departing from the spirit of my invention.

In the modification illustrated in Fig. 4 the upper end of the swinging frame C is provided with an arm, $C^2$, extending upward and forward toward the operator. Instead of the toggle-joint and operating-lever, as in Fig. 3, I provide the bracket with a pair of ways, N N, which support and guide a sliding plate, O. The upper end of this plate is provided with a notch or groove, O', with which the arm $C^2$ engages. The pitman or rod K is attached to the lower end of plate O. The shape and position of the treadle require to be slightly modified to correspond with the other changes in this construction. The operation is as follows: It being desired to connect the machine with the driving-shaft, the operator presses down on the front of the treadle. This raises the sliding block, and by means of arm $C^2$ throws the operating-wheel forward and tightens the driving-belt. To disconnect the machine, the operator presses down on the rear of the treadle, which lowers the sliding block and throws the operating-wheel back against the brake. I have not shown either the machine to be operated or the driving-shaft, for the reason that they form no part of my present invention, and are, moreover, fully shown in my Patent No. 273,627, March 6, 1883. It will of course be apparent that my power-transmitter may be applied to any class of machines, and that any particular location or arrangement of the driving-shaft is not called for.

Having thus described my invention, what I claim as new, and desire to secure by Letters Patent, is—

1. The combination, with a swinging frame and an operating-wheel carried thereby, of means, substantially as described, for carrying said wheel into and out of its operative position, for the purpose set forth.

2. The swinging frame pivoted beneath the table and carrying an operating-wheel, in combination with a toggle-joint connected therewith and means for operating said toggle.

3. The swinging frame and operating-wheel, in combination with means for carrying said frame into and out of operative position, and a rigid brake, against which the wheel bears when thrown out of operative position.

4. The bracket, the swinging frame pivoted thereto, the operating-wheel, and the adjustable rigid brake, in combination with the toggle-joint and the operating-lever.

5. Bracket B, carrying the swinging frame and the brake, and having lever G pivoted thereto, in combination with link G', pivoted at one end to lever G and at the other to the swinging frame, and an operating-lever pivoted to a hanger, as shown.

6. The swinging frame and toggle-joint, in combination with pivoted operating-lever, rod, and treadle, substantially as shown.

In testimony whereof I affix my signature in presence of two witnesses.

WILLIAM R. SOMERS.

Witnesses:
A. M. WOOSTER,
W. W. MORTIMER.